United States Patent
Tertel et al.

(10) Patent No.: US 9,914,886 B2
(45) Date of Patent: Mar. 13, 2018

(54) APPARATUSES AND METHODS FOR CONVERSION OF MERCAPTANS

(71) Applicant: UOP LLC, Des Plaines, IL (US)

(72) Inventors: Jonathan Andrew Tertel, Mount Prospect, IL (US); Jasna Karagic, Chicago, IL (US); Luigi Laricchia, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 588 days.

(21) Appl. No.: 14/300,483

(22) Filed: Jun. 10, 2014

(65) Prior Publication Data

US 2015/0353842 A1 Dec. 10, 2015

(51) Int. Cl.
| | |
|---|---|
| *C10G 53/14* | (2006.01) |
| *B01J 8/04* | (2006.01) |
| *B01J 8/02* | (2006.01) |
| *C10G 27/06* | (2006.01) |
| *C10G 19/02* | (2006.01) |
| *C10G 27/04* | (2006.01) |

(52) U.S. Cl.
CPC .............. *C10G 53/14* (2013.01); *B01J 8/02* (2013.01); *B01J 8/0242* (2013.01); *B01J 8/0446* (2013.01); *C10G 19/02* (2013.01); *C10G 27/04* (2013.01); *C10G 27/06* (2013.01); *C10G 2300/202* (2013.01)

(58) Field of Classification Search
CPC .......... B01J 8/02; B01J 8/0242; B01J 8/0446; C10G 19/02; C10G 27/06; C10G 53/14
See application file for complete search history.

(56) References Cited

U.S. PATENT DOCUMENTS

| 2,646,389 A | 7/1953 | Weisemann |
| 2,921,021 A | 1/1960 | Peter et al. |
| 4,019,869 A * | 4/1977 | Morris ............... B01D 17/0208 |
| | | 208/206 |

(Continued)

FOREIGN PATENT DOCUMENTS

WO 2008133681 A1 11/2008

OTHER PUBLICATIONS

National Petroleum Refiners Association, NPRA ((National Petroleum Refiners Association)) q+a—8 (conclusion). Treating, distillation pose problems, Oil Gass J. V77 N. 29, 71-75 (Jul. 16, 1979), v 77, n. 29, p. 71-75, Jul. 16, 1979; ISSN: 00301388; Publisher: PennWell.

(Continued)

*Primary Examiner* — Renee Robinson

(57) ABSTRACT

Embodiments of apparatuses and methods for conversion of mercaptans are provided. In one example, an apparatus comprises a vessel that is capable to receive a feed stream that comprises liquid hydrocarbons and the mercaptans. The vessel comprises a catalyst bed section that is capable of contacting the feed stream with a catalyst in the presence of oxygen ($O_2$) and caustic at reaction conditions effective to oxidize the mercaptans and form a caustic-containing, sweetened liquid hydrocarbon-containing stream. A coalescing bed section is capable to coalesce and separate at least a portion of the caustic from the caustic-containing, sweetened liquid hydrocarbon-containing stream for forming a caustic-depleted, sweetened liquid hydrocarbon-containing product stream.

19 Claims, 1 Drawing Sheet

(56) References Cited

U.S. PATENT DOCUMENTS

| | | | | |
|---|---|---|---|---|
| 4,199,440 | A | * | 4/1980 | Verachtert .............. C10G 19/02 208/230 |
| 4,207,173 | A | | 6/1980 | Stansky, Jr. |
| 4,412,912 | A | | 11/1983 | Asdigian |
| 4,481,106 | A | * | 11/1984 | Verachtert .............. C10G 27/06 208/203 |
| 4,562,300 | A | | 12/1985 | LaFoy |
| 5,529,967 | A | | 6/1996 | Gillespie et al. |
| 6,749,741 | B1 | * | 6/2004 | Laricchia ............... C10G 19/02 208/226 |
| 7,223,332 | B1 | | 5/2007 | Tertel |
| 7,381,309 | B1 | * | 6/2008 | Laricchia ............... C10G 19/02 196/14.52 |

OTHER PUBLICATIONS

Detrick et al, Gasoline Processes: Alkylation: Question 75, NPRA Question and Answer Session on Refining and Petrochemical Technology, p. 70, 2008, National Petrochemical and Refiners Association—NPRA Q and A and Technology Forum: Answer Book 2008; ISSN: 01620770; ISBN—13: 9781605609652; Conference: NPRA Q and A and Technology Forum 2008, Oct. 5, 2008-Oct. 8, 2008; Publisher: National Petroleum Refiners Association.

\* cited by examiner

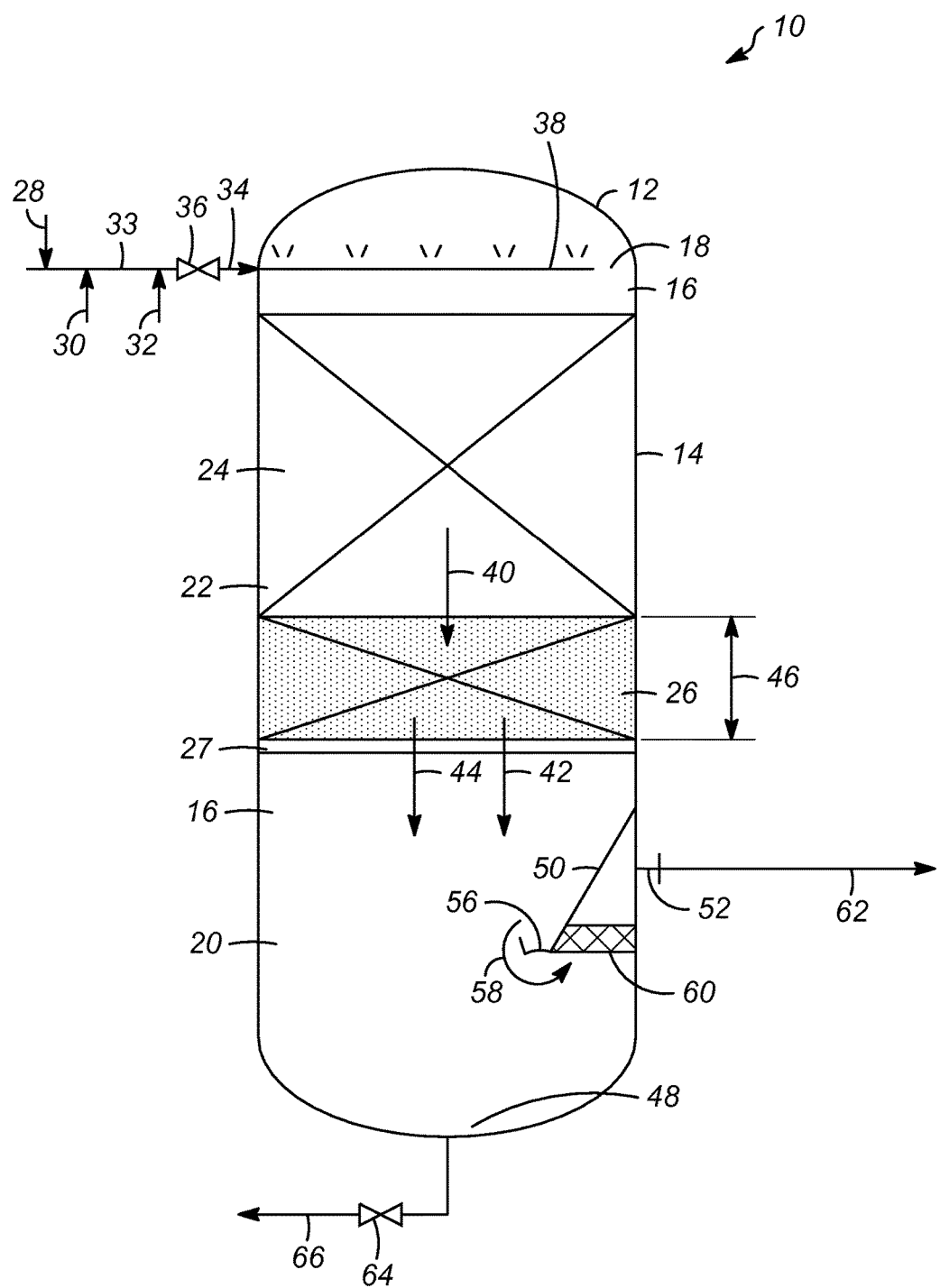

US 9,914,886 B2

APPARATUSES AND METHODS FOR CONVERSION OF MERCAPTANS

TECHNICAL FIELD

The technical field relates generally to apparatuses and methods for conversion of mercaptans, and more particularly relates to apparatuses and methods for the oxidation of mercaptans contained in a feed stream that includes liquid hydrocarbons such as naphtha boiling range hydrocarbons or the like.

BACKGROUND

Sweetening of petroleum fractions, such as naphtha boiling range hydrocarbons or other liquid hydrocarbons, that contain mercaptans (or sour petroleum fractions) are well-developed commercial processes commonly used in many petroleum refineries. In the sweetening process, mercaptans contained in the feed hydrocarbon stream (e.g., sour hydrocarbon stream) are converted to disulfide compounds that remain in the hydrocarbon stream (e.g., sweetened hydrocarbon stream). Sweetening processes, therefore, do not remove sulfur from the hydrocarbon stream but rather convert the sulfur to an acceptable form. The sweetening process involves an admixture of an oxygen-containing stream to the sour hydrocarbon stream to supply the required oxygen. The admixture of hydrocarbons and oxygen contacts an oxidation catalyst in an aqueous alkaline environment to oxidize the mercaptans.

Typically, a caustic (e.g. an aqueous caustic solution) is combined with the sour hydrocarbon stream to create the aqueous alkaline environment. After contacting the oxidation catalysts, at least a portion of the caustic is carried with the sweetened hydrocarbon stream and can be problematic for further downstream processing. Current approaches for removing caustic from sweetened hydrocarbon streams often require additional downstream equipment items and can be costly and/or are relatively inefficient.

Accordingly, it is desirable to provide apparatuses and methods for the oxidation of mercaptans contained in a feed stream that includes liquid hydrocarbons such as naphtha boiling range hydrocarbons or the like for forming a sweetened hydrocarbon stream with enhanced removal of caustic from the sweetened hydrocarbon stream. Furthermore, other desirable features and characteristics of the present invention will become apparent from the subsequent detailed description and the appended claims, taken in conjunction with the accompanying drawings and this background.

BRIEF SUMMARY

Apparatuses and methods for conversion of mercaptans are provided herein. In accordance with an exemplary embodiment, an apparatus for conversion of mercaptans comprises a vessel that is capable to receive a feed stream that comprises liquid hydrocarbons and the mercaptans. The vessel comprises a catalyst bed section that is capable of contacting the feed stream with a catalyst in the presence of oxygen ($O_2$) and caustic at reaction conditions effective to oxidize the mercaptans and form a caustic-containing, sweetened liquid hydrocarbon-containing stream. A coalescing bed section is capable to coalesce and separate at least a portion of the caustic from the caustic-containing, sweetened liquid hydrocarbon-containing stream for forming a caustic-depleted, sweetened liquid hydrocarbon-containing product stream.

In accordance with another exemplary embodiment, an apparatus for conversion of mercaptans is provided. The apparatus comprises a vessel that comprises a vessel wall. The vessel wall extends generally vertically and encloses an internal volume having an upper portion, a lower portion, and an intermediate portion that is disposed between the upper and lower portions. The upper portion of the internal volume is capable to receive a combined stream that comprises liquid hydrocarbons, the mercaptans, caustic, and oxygen ($O_2$). A catalyst bed section is disposed in the intermediate portion adjacent to the upper portion. The catalyst bed section is capable of contacting the combined stream with a catalyst at reaction conditions effective to oxidize the mercaptans and form a caustic-containing, sweetened liquid hydrocarbon-containing stream. A coalescing bed section is disposed between the catalyst bed section and the lower portion of the internal volume. The coalescing bed section is capable to coalesce and separate at least a portion of the caustic from the caustic-containing, sweetened liquid hydrocarbon-containing stream for forming a caustic-depleted, sweetened liquid hydrocarbon-containing product stream. An outlet has an opening that extends through the vessel wall. The outlet is in fluid communication with the lower portion of the internal volume for removing the caustic-depleted, sweetened liquid hydrocarbon-containing product stream from the vessel.

In accordance with another exemplary embodiment, a method for conversion of mercaptans is provided. The method comprises the steps of introducing a feed stream that comprises liquid hydrocarbons and the mercaptans to a vessel. The feed stream is contacted with a catalyst in the vessel in the presence of oxygen ($O_2$) and caustic at reaction conditions effective to oxidize the mercaptans and form a caustic-containing, sweetened liquid hydrocarbon-containing stream. The caustic-containing, sweetened liquid hydrocarbon-containing stream is contacted with inert inorganic particulates that are contained in the vessel to coalesce and separate at least a portion of the caustic from the caustic-containing, sweetened liquid hydrocarbon-containing stream for forming a caustic-depleted, sweetened liquid hydrocarbon-containing product stream.

BRIEF DESCRIPTION OF THE DRAWINGS

The various embodiments will hereinafter be described in conjunction with the following drawing FIGURES, wherein like numerals denote like elements, and wherein:

FIG. 1 schematically illustrates an apparatus and method for conversion of mercaptans in accordance with an exemplary embodiment.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to apparatuses and methods for conversion of mercaptans. The exemplary embodiments taught herein introduce a feed stream that comprises liquid hydrocarbons, such as naphtha boiling range hydrocarbons, kerosene boiling range hydrocarbons, diesel boiling range hydrocarbons, and/or the like, for example naphtha boiling range hydrocarbons, and mercaptans to a vessel. As used herein, the term "naphtha" refers to a middle boiling range hydrocarbon fraction or fractions that are components of gasoline. In an exemplary embodiment, naphtha includes hydrocarbons (e.g., $C_5$-$C_{12}$ hydrocarbons and various olefins, aromatics, and di-olefins) having boiling points at atmospheric pressure of from about 10 to about 220° C. As used herein, $C_x$ means hydrocarbon molecules that have "X" number of carbon atoms, $C_x^+$ means hydrocarbon molecules that have "X" and/or more than "X" number of carbon atoms, and $C_x^-$ means hydrocarbon molecules that have "X" and/or less than "X" number of carbon atoms.

The vessel comprises a catalyst bed section for contacting the feed stream with a catalyst in the presence of oxygen ($O_2$) and caustic at reaction conditions effective to oxidize the mercaptans into disulfide compounds to form a caustic-containing, sweetened liquid hydrocarbon-containing stream that contains the disulfide compounds. A coalescing bed section that contains inert inorganic particulates, e.g., sand, is disposed in the vessel downstream from the catalyst bed section. The caustic-containing, sweetened liquid hydrocarbon-containing stream is passed along to the coalescing bed section and contacts the inert inorganic particulates to coalesce and efficiently separate at least a portion of the caustic from the caustic-containing, sweetened liquid hydrocarbon-containing stream for forming a caustic-depleted, sweetened liquid hydrocarbon-containing product stream. The caustic-depleted, sweetened liquid hydrocarbon-containing product stream comprises the liquid hydrocarbons, such as, for example, naphtha boiling range hydrocarbons, and disulfide compounds. In an exemplary embodiment, the caustic-depleted, sweetened liquid hydrocarbon-containing product stream is substantially depleted of caustic and is removed from the vessel, for example, for further downstream processing without requiring additional equipment items and/or cost for removing caustic.

FIG. 1 schematically illustrates an apparatus 10 for conversion of mercaptans. As illustrated, the apparatus 10 comprises a vessel 12 including a vessel wall 14 that extends generally vertically and encloses an internal volume 16. The internal volume 16 has an upper portion 18, a lower portion 20, and an intermediate portion 22 that is disposed between the upper and lower portions 18 and 20.

In an exemplary embodiment, the vessel 12 has a catalyst bed section 24 that is disposed in the intermediate portion 22 of the internal volume 16. The catalyst bed section 24 contains a catalyst, e.g., a mercaptan oxidation catalyst, with an active catalyst component(s). The catalyst may include the active catalyst component(s) impregnated on a solid material (e.g., particulates) that is retained in the catalyst bed section 24. Any commercially suitable mercaptan oxidation catalyst can be employed as the active catalyst component(s). For instance, a catalyst comprising a metal compound of tetrapyridino-porphyrazine that is retained on an inert granular support may be used. Alternatively, the mercaptan oxidation catalyst may include a metallic phthalocyanine. The metal(s) of the metallic phthalocyanine may be titanium, zinc, iron, manganese, cobalt, and/or vanadium. The metal phthalocyanine may be employed as a derivative compound. Commercially available sulfonated compounds such as cobalt phthalocyanine monosulfonate, cobalt phthalocyanine disulfonate, and/or other mono-, di-, tri-, and tetra-sulfo derivatives may also be employed as the mercaptan oxidation catalyst. Other derivatives including carboxylated derivatives, as prepared by the action of trichloroacetic acid on the metal phthalocyanine, can also be used as the mercaptan oxidation catalyst.

In an exemplary embodiment, the solid material on which the active catalyst component(s) is supported in the catalyst bed section 24 is an inert absorbent carrier material. The carrier material may be in the form of tablets, extrudates, spheres, or randomly shaped naturally occurring pieces. Natural materials such as clays and silicates or refractory inorganic oxides may be used as the support material. The support may be formed from diatomaceous earth, kieselguhr, kaolin, alumina, zirconia, or the like. In an exemplary embodiment, the catalyst comprises a carbon-containing support, such as, for example, charcoal that has been thermally and/or chemically treated to yield a highly porous structure similar to activated carbon. The active catalyst component(s) may be added to the support in any suitable manner, as by impregnation by dipping, followed by drying. The catalyst may also be formed in-situ within the catalyst bed section 24. In an exemplary embodiment, the catalyst contains from about 0.1 to about 10 weight percent (wt. %) of a metal phthalocyanine. The solid or supported catalyst may comprise only the contact material that fills the catalyst bed section 24 or may be admixed with other solids. In an exemplary embodiment, Merox No. 8™, Merox No. 10™, Merox No. 21™, or Merox No. 31™, which are commercially available from UOP LLC and comprise the active catalyst component(s) impregnated on a carbon support, is used as the catalyst.

As illustrated, in an exemplary embodiment, the vessel 12 has a coalescing bed section 26 that is disposed downstream from the catalyst bed section 24 between the upper and lower portions 18 and 20 of the internal volume 16. As will be discussed in further detail below, the coalescing bed section 26 contains inert inorganic particulates that are packed together to facilitate coalescing and separating an aqueous caustic solution from an intermediate sweetened hydrocarbon stream that is advancing through the vessel 12. In an exemplary embodiment, the inert inorganic particulates are particles of sand, which is a naturally occurring granular material composed of finely divided rock and mineral particles comprising, for example, silica (e.g., silicon dioxide ($SiO_2$)) usually in the form of quartz or calcium carbonate ($CaCO_3$) such as in the form of aragonite. Other types of inert inorganic particulates known to those skilled in the art that facilitate coalescing and separating an aqueous caustic solution from an intermediate sweetened hydrocarbon stream may also be used, such as, for example, anthracite coal, other types of coal, or the like. In an exemplary embodiment, the inert inorganic particulates are relatively coarse and have an average particle size of from about 0.25 to about 2 mm.

In an exemplary embodiment, the coalescing bed section 26 is supported by a support grid 27. The support grid 27 is capable to prevent migration of the inert inorganic particulates into the lower portion 20 of the internal volume 16 while allowing various liquid phase components to pass through as will be discussed in further detail below.

In an exemplary embodiment, during operation of the apparatus 10, a feed stream 28 comprising liquid hydrocarbons, such as, for example, naphtha boiling range hydrocarbons, and mercaptans is introduced to the vessel 12. As illustrated, the feed stream 28 is introduced to the vessel 12 by combining a caustic stream 30 and an $O_2$-containing stream 32 with the feed stream 28 in an upstream portion of a fluid circuit 33 to form a combined stream 34 that is passed through a valve 36 and into the vessel 12. In an exemplary embodiment, the caustic stream 30 is an aqueous caustic solution comprising sodium hydroxide (NaOH) that is present in an amount of from about 1 to about 5 wt. % of the aqueous caustic solution. In an exemplary embodiment, the combined stream 34 comprises NaOH that is present in an amount of from about 2 to about 25 ppm by weight based on the total weight of the combined stream 34. In an exemplary embodiment, the $O_2$-containing stream 32 is air and the combined stream 34 comprises $O_2$ present in an amount of about 150% to about 200% of the stoichiometric required amount for oxidation of the mercaptans contained in the feed stream 28 to form disulfide compounds.

As illustrated, the combined stream 34 is distributed in the upper portion 18 of the internal volume 16 of the vessel 12 via a distributor 38. In an exemplary embodiment, the vessel 12 operates as a liquid-full vessel. As used herein, the term "liquid-full vessel" means that during operation, the vessel 12 is completely full of liquid and any gases, e.g., oxygen, air, and/or the like, that are present are dissolved in a liquid phase without forming any pockets of gas or gaseous phase pockets (e.g., air pockets). As such, the combined stream 34 is completely in the liquid phase and flows downstream through the vessel 12 from the upper portion 18 towards the lower portion 20 of the internal volume 16.

The combined stream 34 is passed along from the upper portion 18 to the catalyst bed section 24 and contacts the catalyst that is contained therein. In an exemplary embodiment, the catalyst bed section 24 is operated at reaction conditions effective to oxidize the mercaptans in the presence of $O_2$ and caustic to form disulfide compounds, thereby sweetening the feed stream 28 and forming a caustic-containing, sweetened liquid hydrocarbon-containing stream (indicated by single headed arrow 40). In an exemplary embodiment, the caustic-containing, sweetened liquid hydrocarbon-containing stream 40 comprises the liquid hydrocarbons such as naphtha boiling range hydrocarbons, the disulfide compounds, and at least a portion of the caustic (e.g., aqueous caustic solution). In an exemplary embodiment, the reaction conditions include temperature of from about 20 to about 65° C., a residence time of from about 15 minutes to about 1 hour, and a pressure of from about 345 to about 1030 kPa.

As illustrated, the caustic-containing, sweetened liquid hydrocarbon-containing stream 40 is passed along to the inert inorganic coalescing bed section 26. In the inert inorganic coalescing bed section 26, the inert inorganic particulates are contacted with the caustic-containing, sweetened liquid hydrocarbon-containing stream 40 and help coalesce and separate caustic (e.g., the aqueous caustic solution) from the stream 40 to form a caustic-depleted, sweetened liquid hydrocarbon-containing stream (indicated by single headed arrow 42) and spent caustic aqueous solution (indicated by single headed arrow 44). In an exemplary embodiment, the inert inorganic particulates serve to gather together droplets of caustic dissolved in an aqueous phase in the caustic-containing, sweetened liquid hydrocarbon-containing stream 40 to give them sufficient weight to begin descending towards the lower portion 20 of the vessel 14 independent from the caustic-depleted, sweetened liquid hydrocarbon-containing stream 42.

In an exemplary embodiment, the caustic-depleted, sweetened liquid hydrocarbon-containing stream 42 comprises the liquid hydrocarbons such as liquid hydrocarbons, the disulfide compounds, and is substantially depleted of NaOH. In an exemplary embodiment, the coalescing bed section 26 is operated at conditions that include a residence time of from about 5 to about 15 minutes and has a thickness (indicated by double headed arrow 46) of from about 150 to about 300 mm to allow for sufficient contact between the inert inorganic particulates and the caustic-containing, sweetened liquid hydrocarbon-containing stream 40 to coalesce and remove the caustic.

The caustic-depleted, sweetened liquid hydrocarbon-containing stream 42 and the spent caustic aqueous solution 44 are passed along to the lower portion 20 of the internal volume 16. In an exemplary embodiment, the spent caustic aqueous solution 44 has a density of about 1 to about 1.1 g/cc and the caustic-depleted, sweetened liquid hydrocarbon-containing stream 42 has a density of from about 0.6 to about 0.7 g/cc. As such, the density difference between the spent caustic aqueous solution 44 and the caustic-depleted, sweetened liquid hydrocarbon-containing stream 42 naturally forces the spent caustic aqueous solution 44 to settle proximate a lower-most portion 48 of the internal volume 16 while the caustic-depleted, sweetened liquid hydrocarbon-containing stream 42 tends to settle overlying the spent caustic aqueous solution 44 in the lower portion 20 of the internal volume.

As illustrated, the vessel 12 further comprises a baffle section 50 extending from the vessel wall 14 above an opening of an outlet 52. In an exemplary embodiment, the baffle section 50 extends inwardly and downwardly from the vessel wall 14 into the lower portion 20 of the internal volume at an angle of from about 100 to about 140° to obstruct liquid (e.g., the caustic-depleted, sweetened naphtha-containing stream 42 and the spent caustic aqueous solution 44) flowing down along the vessel wall 14 from exiting directly through the opening of the outlet 52. As such, the baffle section 50 directs the higher density spent caustic aqueous solution 44 towards the lower-most portion 48 of the internal volume 16 while the lower density caustic-depleted, sweetened naphtha-containing stream 42 flows down the baffle section 50 past a distal end portion 56 that is generally below the opening of the outlet 52. The caustic-depleted, sweetened naphtha-containing stream 42 then changes direction (indicated by arrow 58) and flows generally upward along an opposite side of the baffle section 50 towards the outlet 52.

In an exemplary embodiment, the vessel 12 further comprises a coalescing mesh 60 that extends between the distal end portion 56 of the baffle section 50 and the vessel wall 14. The coalescing mesh 60 is capable to coalesce and separate any remaining portion of caustic in the caustic-depleted, sweetened liquid hydrocarbon-containing stream 42 just prior to being advanced through the outlet 52. In an exemplary embodiment, the coalescing mesh 60 serves to gather together droplets of any remaining caustic (e.g., dissolved in an aqueous phase) that rises with the caustic-depleted, sweetened liquid hydrocarbon-containing stream 42 to give them sufficient weight to begin descending towards the lower-most portion 48 of the internal volume 16 with the rest of the spent caustic aqueous solution 44. In an aspect, the coalescing mesh 60 may be made of a hydrophilic material or be coated with a hydrophilic material.

As illustrated, the caustic-depleted, sweetened liquid hydrocarbon-containing stream 42 is removed from the vessel 14 through the outlet 52 as a product stream naphtha. In an exemplary embodiment, the product stream 62 has less than 1 ppm by weight of NaOH. The spent caustic aqueous solution 44 is removed from the lower-most portion 48 of the vessel 14 through a valve 64 as a spent caustic stream 66.

Accordingly, apparatuses and methods for conversion of mercaptans have been described. The exemplary embodiments taught herein introduce a feed stream that comprises liquid hydrocarbons and the mercaptans to a vessel. The feed stream is contacted with a catalyst in the vessel in the presence of oxygen ($O_2$) and caustic at reaction conditions effective to oxidize the mercaptans and form a caustic-containing, sweetened liquid hydrocarbon-containing stream. The caustic-containing, sweetened liquid hydrocarbon-containing stream is contacted with inert inorganic particulates that are contained in the vessel to coalesce and separate at least a portion of the caustic from the caustic-containing, sweetened liquid hydrocarbon-containing stream for forming a caustic-depleted, sweetened liquid hydrocarbon-containing product stream.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. An apparatus for conversion of mercaptans comprising:
a vessel capable to receive a feed stream that comprises naphtha boiling range hydrocarbons and the mercaptans, wherein the vessel comprises:
a catalyst bed section capable of contacting the feed stream with a catalyst in the presence of oxygen ($O_2$) and caustic at reaction conditions effective to oxidize the mercaptans and form a caustic-containing, sweetened naphtha-containing stream;
a coalescing bed section capable to coalesce and separate at least a portion of the caustic from the caustic-containing, sweetened naphtha-containing stream for forming a caustic-depleted, sweetened naphtha-containing product stream, wherein the coalescing bed section comprises sand;
a coalescing mesh disposed downstream from the coalescing bed section and capable to coalesce and separate an additional portion of the caustic prior to the caustic-depleted, sweetened naphtha-containing product stream being removed from the vessel; and
a liquid permeable support grid supporting the coalescing bed section, the liquid permeable support grid positioned between the coalescing bed section and the coalescing mesh, the liquid permeable support grid allowing the caustic and the caustic-depleted, sweetened naphtha-containing product to flow through the liquid permeable support grid to the coalescing mesh.

2. The apparatus of claim 1, wherein the catalyst bed section is capable to operate at the reaction conditions that include a temperature of from about 20 to about 65° C.

3. The apparatus of claim 1, wherein the catalyst bed section is capable to operate at the reaction conditions that include a residence time of from about 15 minutes to about 1 hour.

4. The apparatus of claim 1, wherein the catalyst bed section is capable to operate at the reaction conditions that include a pressure of from about 345 to about 1030 kPa.

5. The apparatus of claim 1, wherein the coalescing bed section comprises inert inorganic particulates having an average particle size of from about 0.25 to about 2 mm.

6. The apparatus of claim 1, wherein the coalescing bed section is capable to operate at conditions that include a residence time of from about 5 to about 15 minutes.

7. The apparatus of claim 1 wherein the coalescing mesh is made of a hydrophilic material or is coated with a hydrophilic material.

8. An apparatus for conversion of mercaptans comprising:
a vessel comprising:
a vessel wall that extends generally vertically and that encloses an internal volume having an upper portion, a lower portion, and an intermediate portion that is disposed between the upper and lower portions, wherein the upper portion of the internal volume is capable to receive a combined stream that comprises naphtha boiling range hydrocarbons, the mercaptans, caustic, and oxygen ($O_2$);
a catalyst bed section disposed in the intermediate portion adjacent to the upper portion and capable of contacting the combined stream with a catalyst at reaction conditions effective to oxidize the mercaptans and form a caustic-containing, sweetened naphtha-containing stream;
a coalescing bed section disposed between the catalyst bed section and the lower portion of the internal volume and capable to coalesce and separate at least a portion of the caustic from the caustic-containing, sweetened naphtha-containing stream for forming a caustic-depleted, sweetened naphtha-containing product stream, wherein the coalescing bed section has a thickness of from about 150 to about 300 mm;
a liquid permeable support grid supporting the coalescing bed section, the liquid permeable support grid positioned between the coalescing bed section and a coalescing mesh, the liquid permeable support grid allowing the caustic and the caustic-depleted, sweetened naphtha-containing product to flow through the liquid permeable support grid to the lower portion of the internal volume; and
an outlet having an opening that extends through the vessel wall, wherein the outlet is in fluid communication with the lower portion of the internal volume for removing the caustic-depleted, sweetened naphtha-containing product stream from the vessel.

9. The apparatus of claim 8, wherein the vessel is capable to operate as a liquid-full vessel.

10. The apparatus of claim 8, wherein the vessel further comprises a distributor disposed in the upper portion of the internal volume and capable to distribute the combined stream in the upper portion for introduction to the catalyst bed section.

11. The apparatus of claim 10, further comprising a fluid circuit section in fluid communication with the distributor, wherein the fluid circuit section is capable to receive a feed stream that comprises the naphtha boiling range hydrocarbons and the mercaptans, a caustic stream that comprises the caustic, and an $O_2$-containing stream that comprises air to form the combined stream.

12. The apparatus of claim 11, wherein the fluid circuit section is capable to receive the caustic stream that is an aqueous solution comprising NaOH present in an amount of from about 1 to about 5 wt. % of the aqueous solution.

13. The apparatus of claim 11, wherein the fluid circuit section is capable to form the combined stream comprising NaOH present in an amount of from about 2 to about 25 ppm.

14. The apparatus of claim 8, wherein the coalescing bed section comprises the inert inorganic particulates, and wherein the support grid that supports the coalescing bed section is capable to prevent migration of the inert inorganic particulates into the lower portion of the internal volume.

15. The apparatus of claim 8, wherein the vessel further comprises a baffle section extending from the vessel wall above the opening of the outlet inwardly into the lower portion of the internal volume, wherein the baffle section is capable to obstruct liquid flowing down along the vessel wall in the lower portion of the internal volume from exiting directly through the opening.

16. The apparatus of claim 15, wherein the baffle section has a distal end portion disposed in the lower portion of the internal volume generally below the opening of the outlet, wherein the coalescing mesh extends between the distal end portion of the baffle section and the vessel wall, and wherein the coalescing mesh is capable to coalesce and separate an additional portion of the caustic prior to advancing the caustic-depleted, sweetened naphtha-containing product stream through the opening of the outlet.

17. The apparatus of claim 8, wherein the lower portion of the internal volume is capable to allow the at least the portion of the caustic separated from the coalescing bed section to collect to form a spent caustic stream, and wherein the vessel has a spent caustic outlet in fluid communication with the lower portion of the internal volume for removing the spent caustic stream.

18. The apparatus of claim 8 wherein the coalescing mesh is made of a hydrophilic material or is coated with a hydrophilic material.

19. A method for conversion of mercaptans, the method comprising the steps of:
   introducing a feed stream that comprises naphtha boiling range hydrocarbons and the mercaptans to a vessel as defined in claim 1;
   contacting the feed stream with the catalyst in the vessel in the presence of oxygen ($O_2$) and caustic at reaction conditions effective to oxidize the mercaptans and form a caustic-containing, sweetened naphtha-containing stream; and
   contacting the caustic-containing, sweetened naphtha-containing stream with inert inorganic particulates that are contained in the vessel to coalesce and separate at least a portion of the caustic from the caustic-containing, sweetened naphtha-containing stream for forming a caustic-depleted, sweetened naphtha-containing product stream.

* * * * *